No. 665,274. Patented Jan. 1, 1901.
A. S. SEAMAN.
RELIEF NUT.
(Application filed Apr. 19, 1900.)
(No Model.)

WITNESSES:
Jos. A. Ryan
Perry B. Turpin,

INVENTOR
Alfred S. Seaman
BY Munn & Co.
ATTORNEYS

United States Patent Office.

ALFRED S. SEAMAN, OF FRACKVILLE, PENNSYLVANIA.

RELIEF-NUT.

SPECIFICATION forming part of Letters Patent No. 665,274, dated January 1, 1901.

Application filed April 19, 1900. Serial No. 13,538. (No model.)

*To all whom it may concern:*

Be it known that I, ALFRED S. SEAMAN, of Frackville, in the county of Schuylkill and State of Pennsylvania, have invented a new and useful Improvement in Relief-Nuts, of which the following is a specification.

My invention is an improvement in relief-nuts intended for use wherever a relief-nut is desired—as, for instance, in places where a bolt cannot be removed and the thread is worn so a nut cannot be tightened and where it is not safe to remove the nut—and to serve as a washer and as a time-saving device for replacing another washer or nut without stopping the machinery.

The invention is also useful in avoiding cutting bolts or splitting nuts and in taking up lost motion in cases where it is not safe to remove the nuts.

My invention consists in certain novel constructions and combinations of parts, as will be hereinafter described and claimed.

Figure 1:
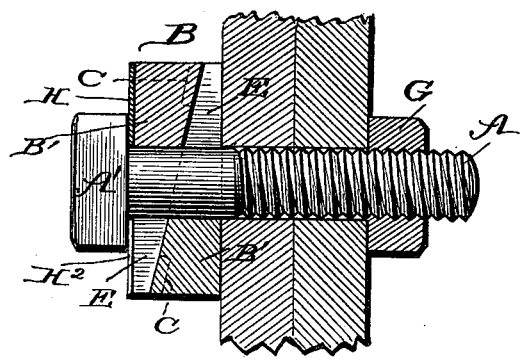
Figure 2:
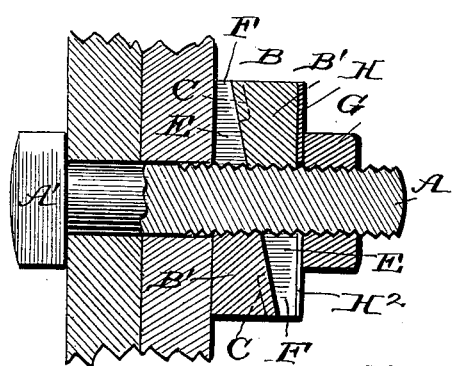
Figure 3:
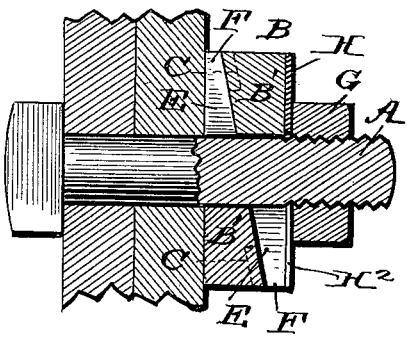
Figure 4:
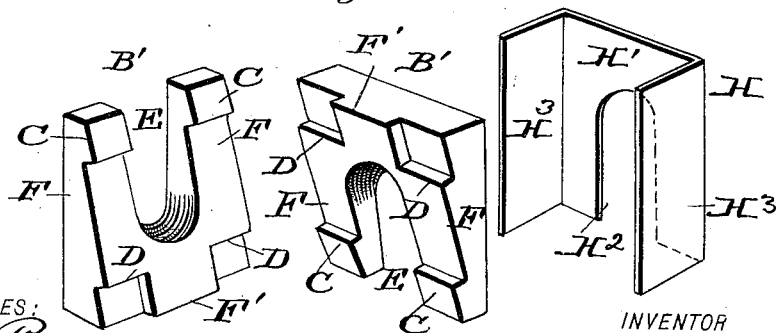

In the drawings, Figures 1, 2, and 3 are sectional views illustrating my improved devices applied for different purposes, and Fig. 4 is a perspective view illustrating the several parts of the device in detail.

My invention as shown is designed for use on a bolt, and it may be arranged next the head A' of the bolt B, as shown in Fig. 1, or beneath the nut, as shown in Figs. 2 and 3.

The relief-nut proper, B, is composed of the two similar sections B' B', fitted face to face, with their outer faces parallel and their inner or abutting faces inclined from end to end relatively to their outer faces and provided with interlocking projections C and shoulders D for engagement thereby. The sections B' are wedge-shaped in longitudinal section and are slotted from their points or thin ends at E, and the arms F formed by such slot fit on opposite sides of a central projection F', which lies between the shoulders D for engagement by the hooks or projections C of the coöperating section. The inner end walls of the slots E are curved and preferably threaded, and when the sections are fitted together, as shown in Figs. 2 and 3, the threaded walls of the matched sections combine to form the threaded opening to turn upon the bolt.

When the sections are applied and fitted tightly, as shown in Figs. 1, 2, and 3, the nut B can only be removed by adjusting the sections B' apart in the direction of length of the bolt by releasing or turning outwardly the nut G upon the bolt.

A cap H is fitted over the relief-nut and forms a bearing for the nut G and a retaining means for the sections B'. As shown, the cap has a top plate H', slotted at H² to slip over the bolt, and depending side plates H³, which lap alongside the relief-nut and overlap the joint between the sections thereof.

In the construction shown in Fig. 1 the improvement is shown applied to the head end of a bolt, and it may be used in this connection when a bolt wears in or partially off or out, as in foundation-bolts and others that are under constant strain and wear.

In Fig. 2 the relief-nut is shown threaded and may be used as a nut as well as a washer. The construction shown in Fig. 2, as well as that shown in Fig. 3, may be employed when the bolt is battered or riveted, or where the thread is stripped, or where the thread does not extend down to the surface against which the nut is to be turned.

Having thus described my invention, what I claim as new, and desire to secure by Letters Patent, is—

1. A relief-nut substantially as described composed of the two nut-sections wedge-shaped in longitudinal section, slotted from their ends producing arms having near their free ends hooks or projections, and having at their opposite ends seats for engagement by the hooks of the abutting section, said sections being fitted together to interlock and embrace the bolt, and the cap H having a top plate slotted from one end to receive the bolt and having depending side flanges substantially as set forth.

2. A relief-nut substantially as described comprising two opposing sections adapted to fit face to face with their outer faces parallel and their inner abutting faces diagonal to their outer ones, the inner faces of the sections being provided with interlocking projections and seats arranged to lock the sections together both longitudinally and circumferentially and said sections being provided with slots leading in reverse directions and combining at their inner ends to form an opening for the bolt substantially as set forth.

3. A relief-nut comprising two opposing sections fitted face to face with their inner abutting faces diagonal to their outer ones, said sections being provided with slots leading in reverse directions, such sections being provided at their slotted ends with hook-like projections C and at their opposite ends with recesses to receive the projections C of the other section, substantially as set forth.

In testimony whereof I have signed my name to this specification in the presence of two subscribing witnesses.

ALFRED S. SEAMAN.

Witnesses:
CHARLES G. REED,
WALTER B. DYER.